B. RANDALL.
Corn Planter.
No 76,658.
Patented April 14, 1868.
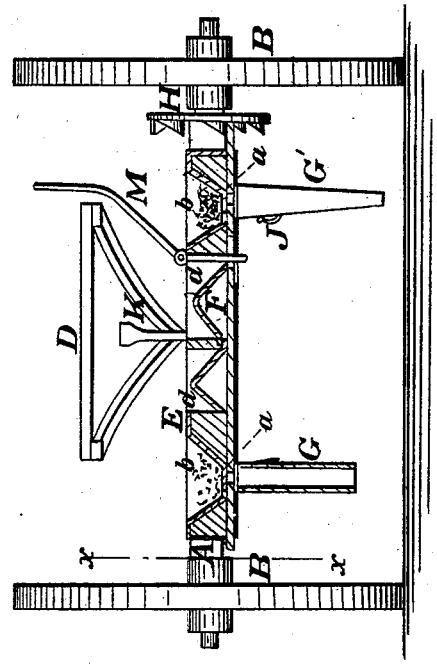
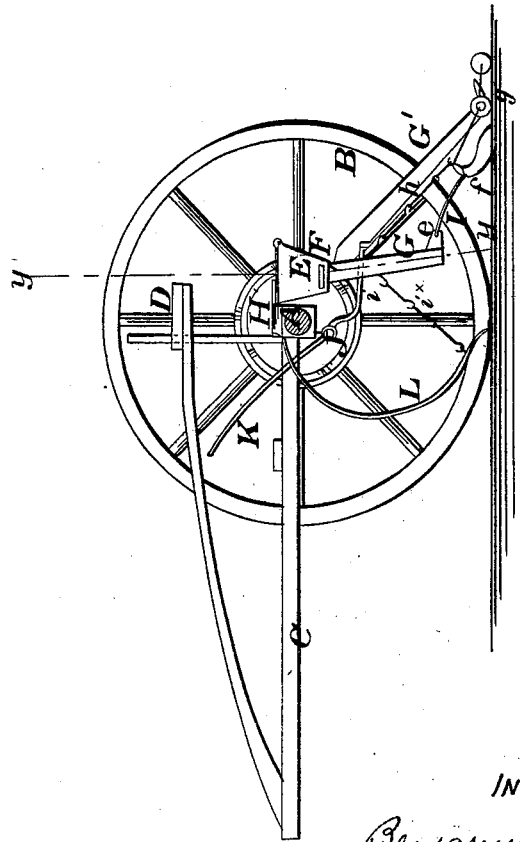
WITNESSES:
Edwin James
John D. Bloor
INVENTOR:
Benjamin Randall
per. Holmead & Hollingshead
Attorneys

United States Patent Office.

BENJAMIN RANDALL, OF ADAMS, NEW YORK.

Letters Patent No. 76,658, dated April 14, 1868.

IMPROVEMENT IN CORN-PLANTERS.

The Schedule referred to in these Letters Patent and making part of the same.

TO ALL WHOM IT MAY CONCERN:

Be it known that I, BENJAMIN RANDALL, of Adams, in the county of Jefferson, and State of New York, have invented a new and improved Corn-Planter; and I do hereby declare that the following is a full, clear, and exact description thereof, which will enable others skilled in the art to make and use the same, reference being had to the accompanying drawings, forming a part of this specification.

This invention relates to a new and improved device for planting corn in hills and in check-rows; and it consists in a novel arrangement of the said tubes, the manner of raising the same, and in a novel furrow-opener and seed-distributing device, whereby several advantages are obtained, as hereinafter set forth. In the accompanying sheet of drawings—

Figure 1 is a side sectional view of my invention, taken in the line $x\ x$, fig. 2.

Figure 2, a transverse vertical section of the same, taken in the line $y\ y$, fig. 1.

Similar letters of reference indicate corresponding parts.

A represents an axle having a wheel, B, on each end of it. C represents the thills, and D the driver's seat. E is a seed-box attached to the rear of the axle A, and provided with a seed-slide, F, having a hole, $a$, in it, near each end, through which the seed is distributed into tubes G G'. The perforated portions of the slide E work at the bottoms of compartments $b$, as shown clearly in fig. 2; and the seed is placed in these compartments, the filled holes $a$ in the slide passing under cut-offs $c$, to prevent the seed in the compartments $b$ passing through the holes $a$ when the latter are over the tubes G G'. The slide F is moved in one direction by a series of springs, $d\ d$, arranged within the seed-box E, and in the opposite direction by a cam, H, on the hub of one of the wheels B. The tube G is connected permanently to the seed-box, and to it lower end a bar, I, is attached, by a hinge or joint, $e$, the bar I having covering-shares $f$ attached to its lower end, and also a roller, $g$, for covering the seed. The lower end of the bar I is connected, by a chain, $h$, to the arm $i$ of a shaft, J, which is underneath the axle A, said shaft having a lever, K, attached, for the convenience of turning it and raising the covering-shares and roller when required.

The furrows are made by elastic curved bars L, which are attached to the top of the axle, and extend down from the same in front of and in line with the seed-tubes. These bars are kept in a proper bent form by a chain, $i^\times$, and their lower ends open the furrows, which receive the seed dropped through the tubes G G', the elasticity of the bars L allowing them to conform to the inequalities of the surface of the ground over which they may pass. This will be fully understood by referring to fig. 1. The chain $i^\times$ connects the bars to the arm $i$ of shaft J, and hence, when the roller $g$ and coverers $f$ are raised, the bars L will be raised also, free from the ground. In lieu of this arrangement, the said tubes may be hinged to the said boxes, and the shaft J provided with an arm, $j$, to catch under and raise the tubes. The tube G' has this arrangement applied to it. In this case the covering-shares and rollers are attached directly to the tubes.

The seed-slide E has a lever, M, connected to it, by which the slide may be kept free from the cam H, and rendered inoperative when desired. The cam H may be made with a greater or less number of projections, according to the distance apart the corn is to be dropped.

Having thus fully described my invention, what I claim as new therein, and desire to secure by Letters Patent of the United States, is—

1. The seed-slide F and the springs $d\ d$, when the latter are arranged within the seed-box E, and the whole so combined as to operate substantially as described and for the purpose specified.

2. The seed-slide F, when arranged in relation with the spring $d$, cam H, and the lever M, substantially in the manner as and for the purpose set forth.

3. The elastic furrow-openers L, arranged and applied in connection with the shaft J, substantially as shown and described.

4. The tube G and bar I, in combination with the covering-shares $f$ and roller $g$, when the same are constructed and arranged substantially as described.

5. The bar I, attached to the lower end of the seed-tube G, and provided with the covering-shares $f$ and roller $g$, in combination with the shaft J, arm $i$, and chain $h$, all arranged to operate in the manner, substantially as and for the purpose set forth.

In testimony whereof, I have signed my name to this specification in the presence of two subscribing witnesses.

B. RANDALL.

Witnesses:
    JOHN D. BLOOR,
    EDWIN JAMES.